Nov. 20, 1951 R. E. CARTER ET AL 2,575,548
SEAT COVER
Filed Dec. 23, 1946 3 Sheets-Sheet 1

INVENTORS
Robert E. Carter
Harry M. Hutchinson
by Wm. Steel Jackson and Son
ATTORNEYS

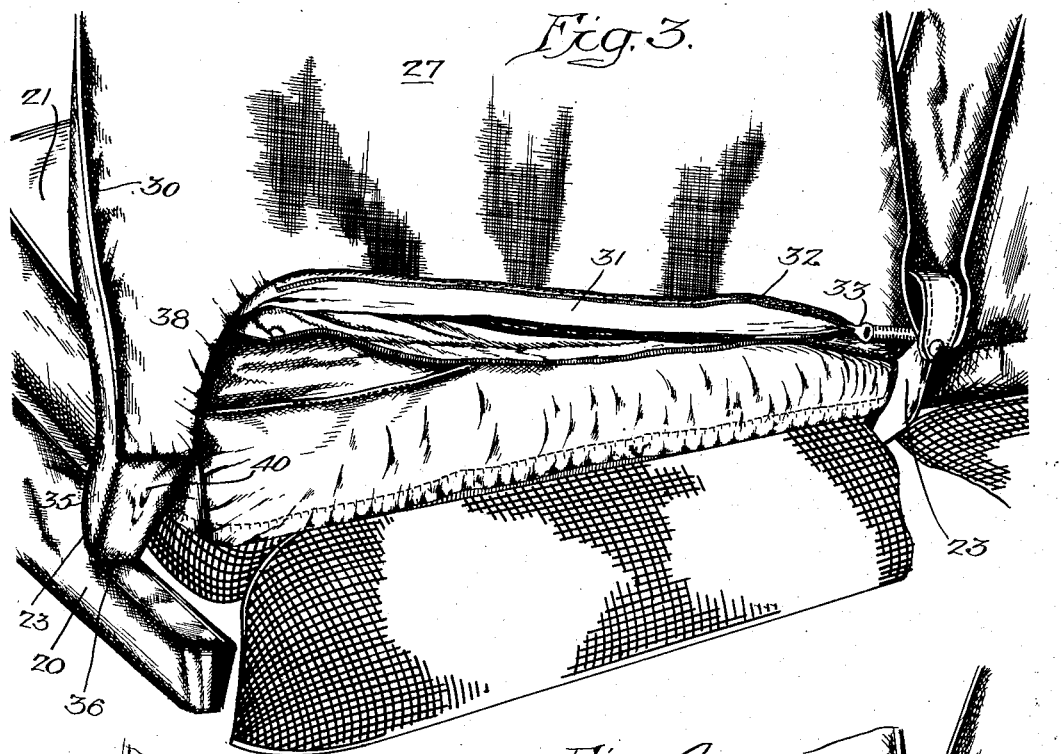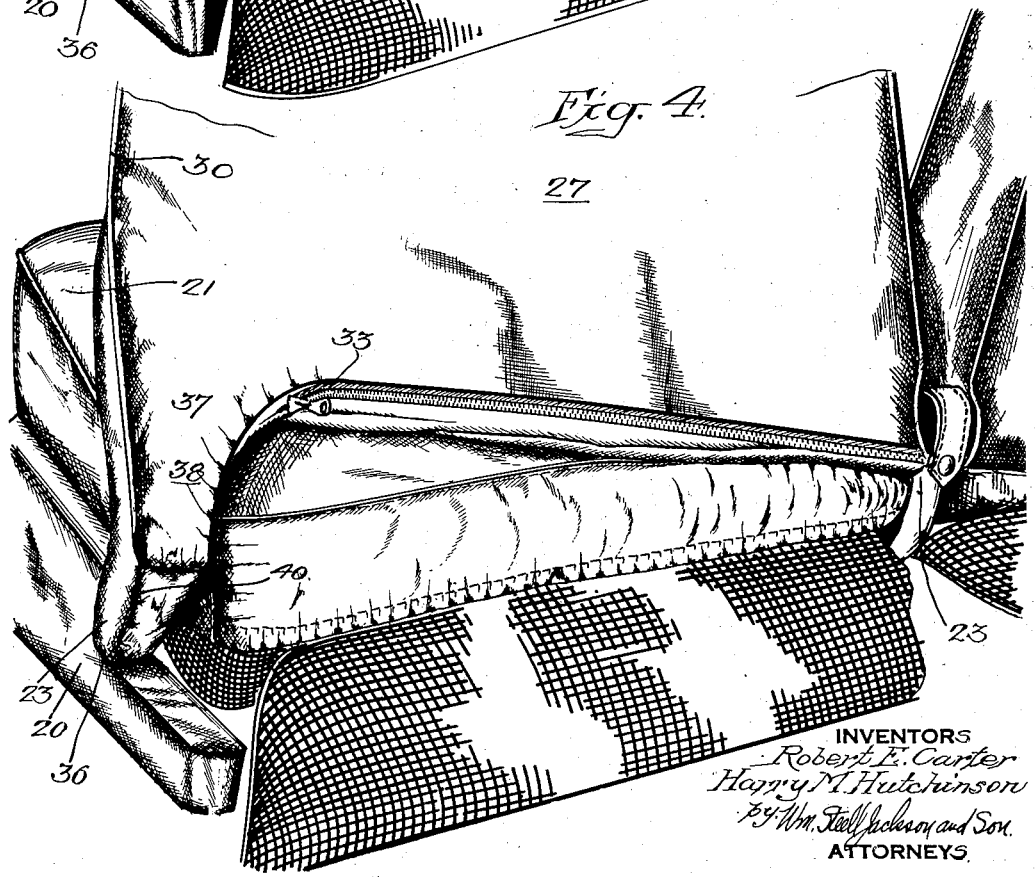

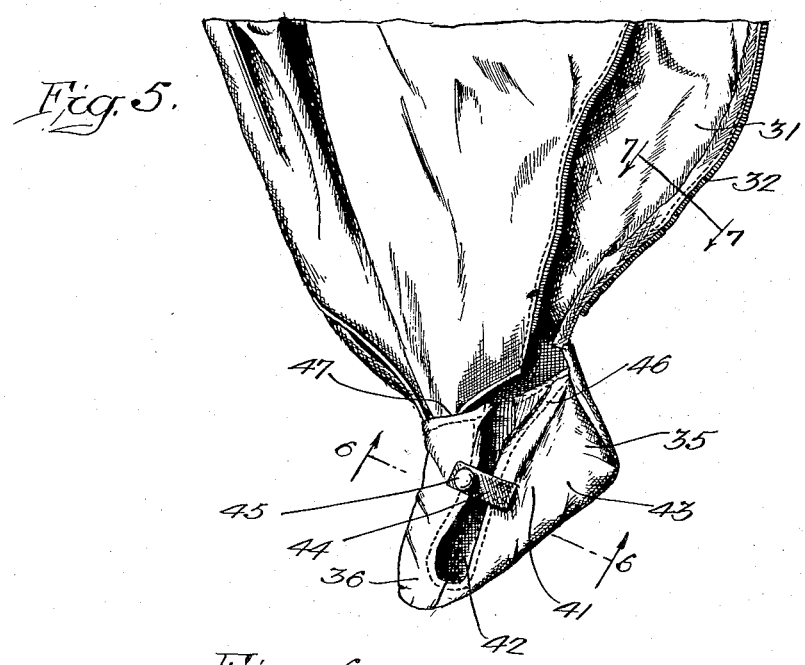
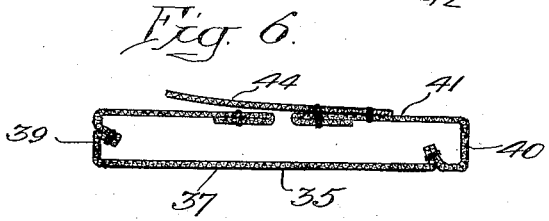

Patented Nov. 20, 1951

2,575,548

UNITED STATES PATENT OFFICE 2,575,548

SEAT COVER

Robert E. Carter, Mount Holly Springs, and Harry M. Hutchinson, Carlisle, Pa., assignors to C. H. Masland & Sons, Carlisle, Pa., a corporation of Pennsylvania Application December 23, 1946, Serial No. 718,000

2 Claims. (Cl. 155—182)

Our invention relates to seat covers particularly for folding vehicle seats.

A purpose of our invention is to make it possible to provide seat covers on folding vehicle seats without preventing folding of the backs of the seats and without pulling, tearing or distorting the seat covers during folding.

A further purpose is to provide coverage for the unattractive hinge and other folding mechanism on folding vehicle seats when supplied with seat covers.

A further purpose is to secure a seat covering around the operating mechanism of the folding back of a vehicle seat, without the necessity of application of separate seat cover components, and without rendering visible unattractive slits, pleats, bulges and other unattractive elements near the folding mechanism.

Further purposes appear in the specification and in the claims.

In the drawings we have chosen to illustrate a single embodiment of our invention, choosing the form shown from the standpoint of convenience in illustration, satisfactory operation and clear demonstration of the principles involved.

Figure 3 is a perspective showing the rear of the seat back in Figure 2, with the closure for the bottom of the case portion partially completed.

Figure 4 is a view corresponding to Figure 3, with the closure fully completed.

Figure 5 is an elevation of the seat cover of our invention spread out in folded position removed from the seat in order to show the inside of the boot.

Figure 6 is an enlarged section of Figure 5 on the line 6—6.

Figure 7 is an enlarged fragmentary section of Figure 5 on the line 7—7.

In the drawings like numerals refer to like parts throughout.

Figure 1:
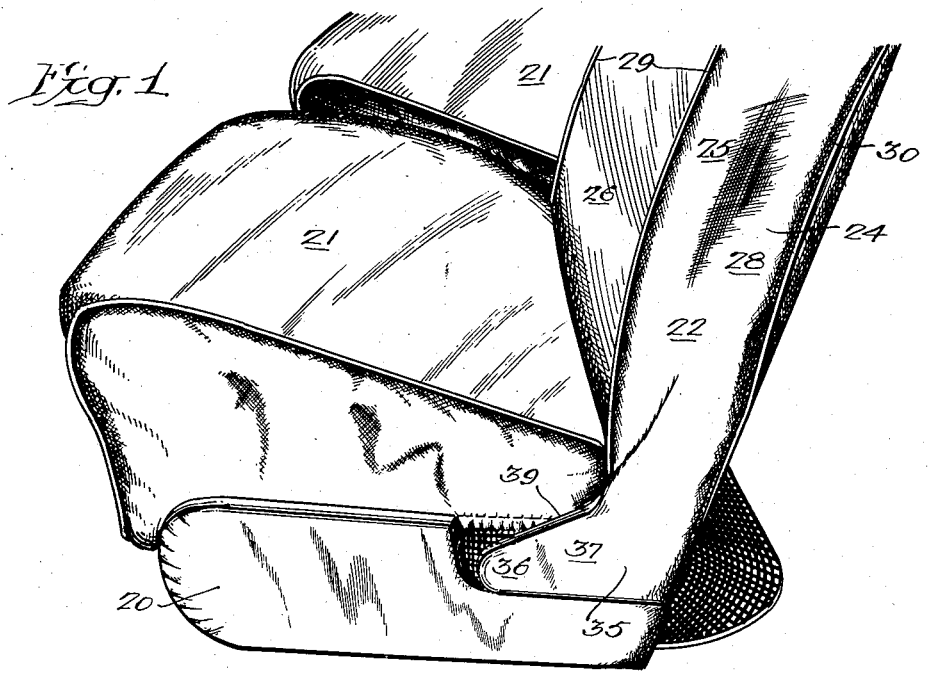
Figure 1 is a fragmentary perspective of an automobile seat to which our invention has been applied, with the seat back in normal or unfolded position.

Describing in illustration but not in limitation and referring to the drawings:

In certain vehicles it has been common to employ seats having folding backs. This construction has been almost universal in certain models of two-door sedan automobiles, where one or both front seats fold to aid in access to the rear seat.

Structures of this kind have imposed a serious problem to designers of seat covers. It has been possible to provide over-all seat covers for the seat back and the seat bottom, but in such cases one of two difficulties has arisen. On one hand, where the seat covers have been made trim and well fitting, it has been very difficult to fold the seat back, or, where it has been folded, the seat covers have frequently been pulled, worn or torn due to the distortion incident to folding. On the other hand, where excess fullness, slits or pleats have been provided to facilitate the folding, these have been bulky, unattractive, likely to catch dust, and frequently subject to snagging, or likely to catch the foot of a passenger stepping over to the back seat.

Where efforts have been made to make wholly separate covers for the bottoms and for the backs of the folding-back seats, the hinge portion has proved to be a very serious obstacle, and has commonly been left exposed, greatly detracting from the appearance of the seat cover and frequently leaving projecting metal parts which can be accidentally caught on the clothing of the user.

By our invention we have developed a very simple and convenient seat cover for the backs of folding seats, with simple and adequate provision for covering the hinge portion, without in any way impairing the operation.

Our invention is concerned primarily with the extension of a boot down below the case portion of the seat cover, and opening of the inside of the boot to surround the hinge portion.

In the drawings we illustrate a seat of the folding back automobile type comprising a seat frame 20 supporting suitably separate bottom cushions 21 and seat backs 22 hingedly connected to the supports at 23 on each side.

The seat back is provided with a cover 24 having a case portion 25 which is closed at the top (not shown), at the front 26, at the back 27 and at the sides 28. For convenience the front 26 is joined to the sides 28 by vertical seams 29 at the corners and the back 27 is joined to the sides 28 by vertical seams 30 at the corners.

The bottom is suitably open at 31 from side to side, and the opening at 31 is suitably closed by convenient fastening means extending from side to side preferably at the bottom of the back of the seat back, as best seen in Figures 3 and 4. While the fastening means may be of any suitable type, we preferably provide a zipper or slide fastener 32 having a slider 33 which is shown mostly open in Figure 3 and fully closed in Figure 4. As well illustrated in Figure 7, one-half of the slide fastener is secured as by stitching 34 to the portion of the seat cover which extends across the bottom of the seat back, the other portion being similarly secured to the panel of the seat cover which extends over the back of the seat back.

By pulling the slide fastener it is possible to draw the front and back panels of the seat cover taut as later explained.

On the outside edge, the side panel 28 of the seat cover is suitably extended downward to form a boot 35, which is closed on the outside and extends fully over the outside portion of the hinge parts. The boot has a forwardly extending toe portion 36 which covers the actual hinge pivot. Thus the boot fully and smoothly covers the hinge parts by its outside side 37, its boot 38, its top 39 and its bottom 40, being open only at its inside side 41. The inside side 41 as best seen in Figure 5 is slit at 42 in prolongation of the opening 31 at the bottom of the seat cover case, the slit 42 desirably extending diagonally of the boot but not fully to the edges, so that inner edge portions 43 are available on the inside side of the boot to hold it in place when the slit 42 is locked together as by a strap 44 held by a snap fastener 45.

Thus it will be seen that after the case portion of the side cover has been drawn down over the seat back, the boot, partaking of the nature of a flat bag, and with the strap 44 open, can be slipped over the hinge portion, gathering the edge flap material at 43 on the inside of the hinge, and securing the boot firmly in place by fastening the strap 44. The closing of the slide fastener 32 draws tight the material on the inside of the boot, particularly at the top of the boot, and aids in holding the boot in place.

Figure 2:
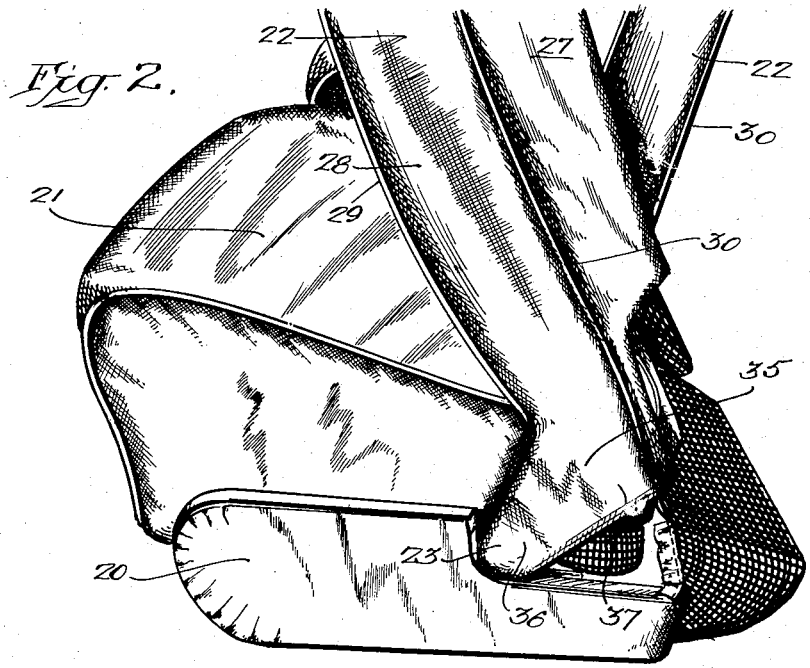
Figure 2 is a view corresponding to Figure 1, showing the seat back folded.

The boot thus provides a very trim cover for the hinge parts when the seat back is upright as in Figure 1, and is equally effective and efficient when the seat back is rocked forward as in Figures 2, 3 and 4.

It will further be evident that for convenience the inside gathering material of the boot at 43 is separated from the adjoining material of the seat cover case, providing an edge 46 at one side of the slit and a separate edge 47 at the other side. By this means it is possible to assure sufficient freedom of the fabric of the boot to permit placing the boot over the hinge parts, when the slide fastener is open.

In operation, the seat cover of the invention can readily be applied to a seat back having no seat cover by pulling down the case portion tight over the seat back, placing the boot as described, and closing the slide fastener or other attachment means along the bottom of the back. As thus applied, the seat cover will normally be quite tight and suitable for use if the design has been properly fitted. Where, however, shrinkable fabrics are employed, it is very convenient to assure additional tightness by applying the seat covers dry and then sponging in place to obtain extra tightness by the final shrinking incident to the sponging.

In view of our invention and disclosure variations and modifications to meet individual whim or particular need will doubtless become evident to others skilled in the art, to obtain all or part of the benefits of our invention without copying the structure shown, and we, therefore, claim all such insofar as they fall within the reasonable spirit and scope of our claims.

Having thus described our invention what we claim as new and desire to secure by Letters Patent is:

1. In a removable cover for the back of a vehicle seat which is pivoted at a projecting toe portion of the seat adjacent the bottom of the back at one side of the seat, a case portion closed at the front, back and sides having a bottom opening and adapted to envelope the seat back, a fastening between the front and the back across the edges of the bottom opening and a boot at one side extending below the case portion in operative position, having a toe portion extending forwardly, closed over the front, outside and bottom and having flaps extending on the inside of the boot from the front and from the bottom and a fastening at the inside of the boot holding together the flaps.

2. In a removable cover for the back of a vehicle seat which is pivoted at a projecting toe portion adjacent the bottom of the back on one side of the seat, a case portion closed at the front, back and sides, having a bottom opening and adapted to envelope the seat back, a slide fastener adjoining the edges of the bottom below the seat back, a boot extending below the case portion at one side in normal operative position, the boot being closed at the outside and bottom and open on the inside and having flaps extending inwardly from the front, bottom and rear of the boot and a fastening securing the flaps together at the inside of the boot.

ROBERT E. CARTER.
HARRY M. HUTCHINSON.

REFERENCES CITED

The following references are of record in the file of this patent:

UNITED STATES PATENTS

| Number | Name | Date |
|---|---|---|
| 1,763,001 | Masury | June 10, 1930 |
| 1,830,119 | Marshall | Nov. 3, 1931 |
| 2,266,505 | McCormick | Dec. 16, 1941 |